A. L. GARDNER.
MEAT SLICING MACHINE.
APPLICATION FILED DEC. 28, 1912.
1,152,623.
Patented Sept. 7, 1915.
2 SHEETS—SHEET 1.
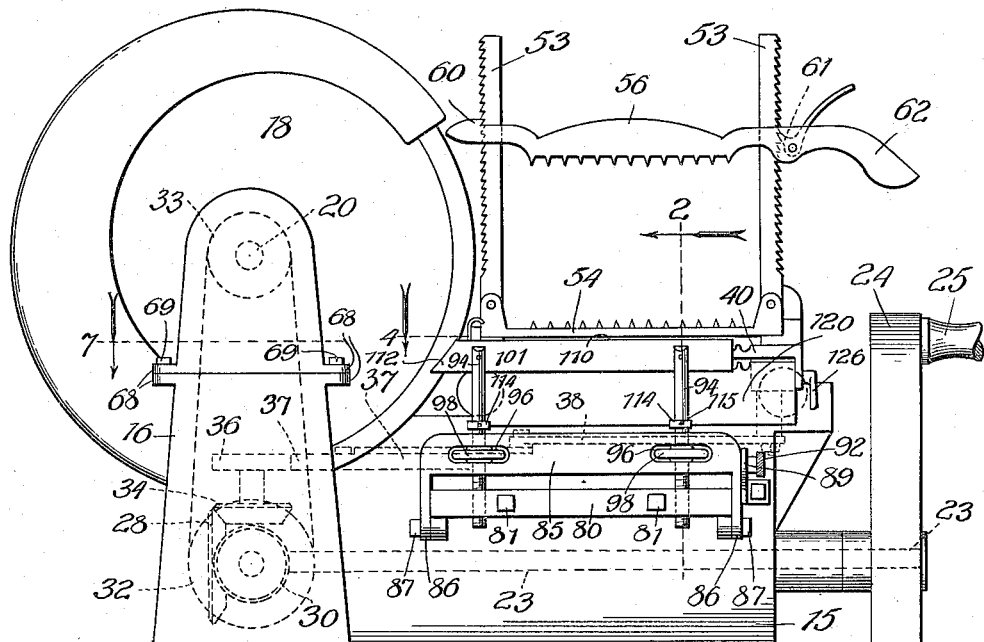
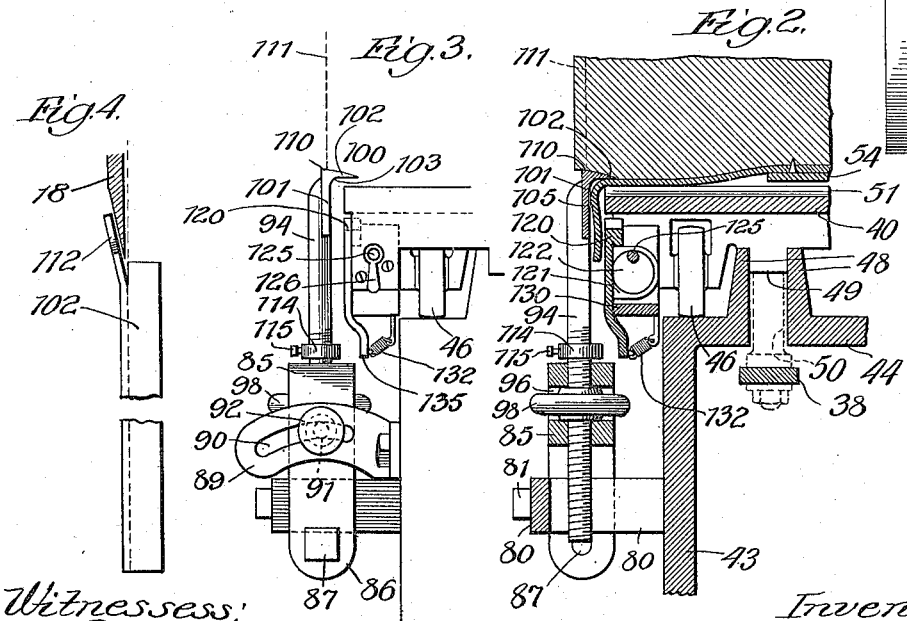
Inventor
Adelbert L. Gardner,
By Hirschl & Hirschl
Att'ys

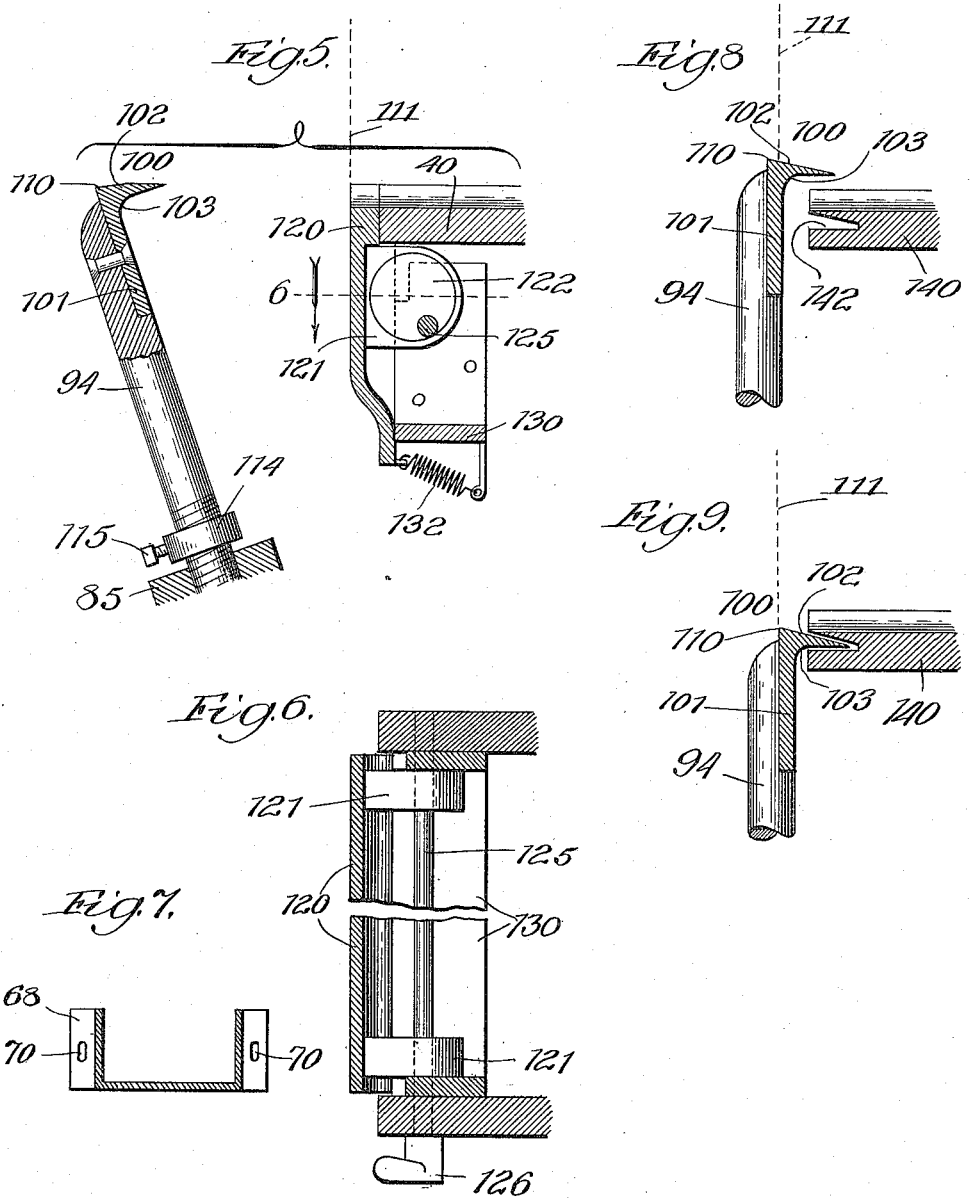

UNITED STATES PATENT OFFICE.

ADELBERT L. GARDNER, OF CHICAGO, ILLINOIS, ASSIGNOR OF ONE-HALF TO CURTIS H. GARDNER.

MEAT-SLICING MACHINE.

1,152,623.      Specification of Letters Patent.      Patented Sept. 7, 1915.

Application filed December 28, 1912. Serial No. 739,034.

*To all whom it may concern:*

Be it known that I, ADELBERT L. GARDNER, a citizen of the United States, residing in the city of Chicago, Cook county, Illinois, have invented new and useful Improvements in Meat-Slicing Machines, of which the following is a specification.

This invention relates to meat slicing machines and more especially to means employed in connection with such machines for separating the rind from the meat.

Heretofore it has been observed that an improvement was desired over the old way of removing the rind from a piece of meat by hand, and means have been provided for doing this automatically; and during the slicing operation in order that the rind may be left on the meat as long as possible to better preserve it from contact with the air. It has been unavoidable however that after the first slice has been taken from the meat there is left an exposed raw surface, while at the same time the separated rind has been cut by the slicing knife into narrow strips, making it unavailable as a covering for such raw surface, and of no practical value as a salable product, or for any other purpose. One of the objects therefore of the present invention is to provide means used in connection with a meat slicing machine for separating the rind from the meat without cutting or injuring it in any way, but leaving it attached to the meat at one edge in order that it may be folded over and used to cover the exposed surface of raw meat left after the slicing operations; or, if desired, may be subsequently severed by the slicing knife in a single piece, useful as a by-product, or otherwise.

A device embodying the principles of the present invention is illustrated in the accompanying drawings in which:

Figure 1 is a view in front elevation. Fig. 2 is a vertical section on the line 2 of Fig. 1. Fig. 3 is a partial view in side elevation. Fig. 4 is a horizontal section on the line 4 of Fig. 1. Fig. 5 is a vertical section similar to Fig. 2, but showing the parts in an altered position. Fig. 6 is a horizontal section on the line 6 of Fig. 5. Fig. 7 is a horizontal section on the line 7 of Fig. 1. Fig. 8 is a partial view similar to Fig. 2 but showing a modified form of the device. Fig. 9 is a view similar to Fig. 8 but showing the parts in an altered position.

As shown in said drawings the complete slicing machine comprises a suitable base frame 15 having at its side upright standards, one of which is indicated at 16, supporting a circular rotating knife 18 which is mounted on a horizontal shaft 20 journaled in the upper ends of such standards. The knife is driven through suitable gearing from a horizontal shaft 23 having at its outer end a fly wheel 24 in which is fixed a handle 25; the connection to the circular knife as here shown comprising a bevel gear 28, on the inner end of the shaft, meshing with another bevel gear 30 on a horizontal shaft and integral with a sprocket 32 which is connected by a chain to another sprocket 33 fixed to the hub of the circular knife. A third bevel gear 34 is mounted on a vertical shaft and carries on its hub a pinion 36 meshing with a larger pinion or gear 37 having a crank pin and a connecting rod 38 for reciprocally moving a traveling meat carriage or meat supporting platform 40, above the base 15, whereby the meat is moved toward the edge of the knife for the proper slicing operation. The supporting base 15 is made somewhat in the form of a box, having a high vertical front wall 43, and a flat horizontal top 44 on which the traveling meat platform is supported by wheels 46; and the driving shaft 23 is journaled in an opening through a side wall of the base and extends through its interior toward the opposite side where are arranged the bevel gears and other parts for rotating the circular knife. A transverse slot through the horizontal top 44 of the supporting base is bounded by parallel vertical flanges in the form of walls 48, and between such walls and depending from the meat platform 40 is a flange 49 which guides the moving platform or carriage; and also a post 50 which extends into the hollow base and is connected at its lower end to the connecting rod 38. The upper surface of the meat supporting platform 40 is made with longitudinal grooves or flutings 51 to prevent the meat from slipping sidewise, and at its rear is erected a frame comprising vertical posts 53, a lower, toothed horizontal bar 54, and a movable, toothed, upper bar 56 for securely fastening the meat to the carriage; the two posts 53 having notches for engagement respectively by a hook-shaped part, or notch 60 on one end of the top bar 56, and a movable pawl 61 at its other end; such bar having a handle 62 for convenient manipulation.

In order that the rotary knife 18 may be adjusted in its proper cutting relation to the edge of the meat supporting platform 40, the standard 16 is separated in a horizontal plane and the two parts are made with horizontal flanges 68 secured together by bolts 69, one of the flanges being slotted as shown at 70 in Fig. 7 to permit of such required relative adjustment of the parts. These parts are all made in accordance with well known principles and embodying the construction of machines at present on the market, and are accordingly indicated here diagrammatically merely, and to some extent in dotted outline only; and their particular construction constitutes no part of the present invention.

The operation of this part of the device is as follows: The piece of meat to be sliced is placed on the platform 40, with a part of it resting on the toothed bar 54, and is clamped securely in place by means of the clamping bar 56. In rotating the shaft 23 by means of the fly wheel and handle on its end the cutting knife 18 is rapidly rotated through the gearing in the base of the device and the connecting rod 38 acts to slide the meat platform back and forth, and a feeding device, not here shown but likewise made in accordance with well known principles, feeds the meat forward on the meat platform so that the operation is to slice thin slices of meat off the end of the piece.

Referring now more particularly to the attachment or addition to the above described machine which constitutes the subject of the present invention, 80 indicates a horizontal shelf or ledge which extends from the wall 43 somewhat below the meat platform 40, being bolted to such wall by means of bolts 81. This shelf or ledge forms the support for a swinging frame 85 which is placed immediately above it and is formed with integral downward extensions 86, 86 at each end, the latter being pivotally attached by means of bolts or cap screws 87 to the ends of the ledge 80; whereby the frame 85 is free to move toward and from the vertical face of the wall 43 about its horizontal axis formed by the bolts 87. Its movement however, is limited by a bracket 89 similarly bolted to the vertical wall 43 and having an arc-shaped slot 90 through which extends a threaded pin or stud 91 on the end of the frame 85; such stud having a knurled nut or hand wheel 92 on its end for the purpose of fixing the swinging bracket in its desired positions. Two openings are made vertically through the frame member 85 and into these are set cylindric posts 94 which are made a sliding fit within the openings. These posts are threaded, and through the frame member 85 and intersecting the vertical openings are also made laterally extended horizontal openings or slots 96 in which are set nuts in the form of small hand wheels 98 having threaded openings through their hubs to engage with the threaded posts 94 for the purpose of raising and lowering them. To the upper ends of the posts 94 is fixed a horizontal stripper 100. This is angular as viewed in cross section (Fig. 3) and comprises a vertical web part or plate 101 and an integral horizontal flange, or ledge 102, with a sloping top surface, which flange is made tapering in thickness and terminating in a thin rear edge adapted for forcing between the rind and the meat in the forward feeding of the latter. The underside of the horizontal part 102 and the inner side of the vertical part 101 meet in a rounded surface 103, as shown, in order that the detached rind 105 may be directed downward in the outward movement of the meat and withheld from the knife 18; and in the operation of the device the outward feeding of the meat and its reciprocal lateral movement on the sliding platform 40 causes the stripper 100 to be forced between the meat and the rind and the rind to be curved and directed downward, while the meat is fed forward and supported on the upper surface of the horizontal part 102 and sliced by the knife 18; the upper side of the stripper and the outer side of the vertical part meeting in an abrupt edge 110 to form a shearing element in connection with the circular knife, whose cutting plane is indicated by the dotted lines 111. At the end of the stripper adjacent to the knife the vertical part 101 is extended beyond the horizontal ledge 102 and flared outward to form a part 112 over-lapping the circumference of the circular knife and closely adjacent to its side for the purpose of better supporting the meat which slides over the top of the stripper in the feeding operation toward the knife. The stripper supporting posts 94 are adjustable in height by means of the hand wheels 98 to allow for different thicknesses of rind, and their downward adjustment is limited by means of threaded collars 114 fixed by set nuts 115, in order to prevent them from being lowered enough to interfere with the platform 40. When it is desired that the stripper shall not operate, as for the purpose of severing the piece of rind remaining after one or more slicing operations, or when it is desired to remove the unsevered piece of rind from beneath the stripper to permit it to be folded as a covering over the exposed surface of meat, the supporting bracket 85 may be swung forward, away from the meat platform 40, about its horizontal pivot below; and to allow the necessary freedom of movement of the posts 94, a large opening is made in the shelf 80 to accommodate their lower ends.

When it is desired also that the stripper shall remain inoperative, as for example in operating on a piece of meat which has no rind, it may be swung forward and outward as above noted; and in such case, for the purpose of properly supporting the meat at the forward edge of the meat platform, there is raised into position from beneath the projecting edge of the platform 40, a filling member, or movable ledge 120, comprising a vertical plate with its upper edge grooved to correspond with the grooves in the platform 40. It is supported by integral brackets in the form of vertical flanges or ribs 121 with openings therethrough to form eccentric straps engaging with eccentrics 122 on a horizontal shaft 125, by the rotating of which the plate 120 is raised and lowered; a handle 126 being fixed to its outer end for such purpose. A horizontal ledge 130 below the eccentric shaft forms a stop or rest for the movable plate 120, and a spring 132 acts to draw its lower edge backward or toward such stop. It will be seen therefore that when the eccentrics are rotated in a direction to raise the plate, the spring will act to draw its lower edge backward and thereby move its upper edge forward to clear the overhanging forward edge of the platform 40 and permit it to be raised into its proper position against the end of and supplementing the length of the platform. The lower part of the plate 120 is slanted backward and thence downward to form a part 135 in a vertical plane back of the plane of its upper part so that when it is in its raised position the bottom part can rest against the stop 130 while the top part rests against the edge of the meat platform; where the movable ledge is securely clamped in position by further rotating the eccentrics sufficiently to press it backward and against such surfaces.

In Figs. 8 and 9 is illustrated a form of the device in which the adjustable meat supporting member 120, and its eccentric shaft and other parts, are omitted, and in such case the edge of the meat platform, which is indicated in these views at 140, is provided with a recess or groove 142 in its front edge. When it is desired that the stripping devices shall remain inoperative the stripper 100 is swung forward and lowered, and then swung backward upon its horizontal pivot to enter such groove, as shown in Fig. 9; but with its projecting part supporting the meat in the proper position adjacent to the slicing knife, whose cutting plane is indicated by the dotted line in Fig. 9. In order to permit of such lowering of the stripper however, the collars 114 are either adjusted farther upward on the threaded posts 94, or may be omitted entirely.

In addition to the other advantages enumerated of separating the rind from the meat without entirely detaching it therefrom, such operation also results in great economy, as when a piece of meat has been sliced away until only a small part remains, the piece may be turned around and secured by clamping another piece of meat over the attached flap of rind, and being thus supported, may be sliced away completely.

I claim as my invention:

1. In a meat slicing machine, the combination with a meat supporting platform and a slicing knife, of a rind stripper adjacent the edge of such platform, such stripper being adapted to support the meat in cutting position and to withhold the rind from the slicing knife, means for adjusting the rind stripper in such position as not to separate the rind from the meat, and means for supporting the forward edge of the meat in the proper cutting position when the stripper is in such latter position.

2. In a meat slicing machine, the combination with a meat supporting platform and a slicing knife, of a shelf below such platform, a bracket pivoted to such shelf, posts supported in such bracket, a rind stripper at the top of such posts, and means for raising and lowering such posts.

3. In a meat slicing machine, the combination with a meat supporting platform and a slicing knife, of a ledge below such platform, a bracket supported by such ledge and having an opening therethrough, a threaded post set in such opening, a nut engaging therewith, and a rind stripper at the top of such post.

4. In a meat slicing machine, the combination with a meat supporting platform and a slicing knife, of a rind stripper adjacent the edge of such platform the top surface of such rind stripper sloping toward such meat supporting platform and terminating in a thin edge, such stripper being adapted to separate the meat from the rind, to support the meat in cutting position, and to withhold the rind from contact with the edge of the slicing knife.

5. In a meat slicing machine, the combination with a slicing knife and a meat supporting platform, of a rind stripper adjacent the edge of such platform, such rind stripper having an upper surface adapted to support the meat in proper cutting position, and a lower surface adapted to withhold the rind from the slicing knife.

6. In a meat slicing machine, the combination with a slicing knife and a meat supporting platform, of a rind stripper adjacent the edge of such platform, such rind stripper having a flat upper surface to support the meat, a thin edge, and a curved under surface adapted to turn the rind downward.

7. In a meat slicing machine, the combination with a slicing knife and a meat supporting platform, of a rind stripper adjacent the edge of such platform, such rind stripper having a flat upper surface to support the meat, a thin edge, and a curved under surface adapted to turn the rind downward, and being vertically adjustable.

8. In a meat slicing machine, the combination with a laterally, reciprocally, movable meat supporting platform and a slicing knife having its cutting edge in a plane beyond the front edge of such platform, of a stationary rind stripper extending across the front edge of such platform, having a surface adapted to support the meat in position for cutting, and an under surface adapted to withhold the rind from the slicing knife.

9. In a meat slicing machine, the combination with a laterally, reciprocally, movable meat supporting platform and a slicing knife having its cutting edge in a plane beyond the front edge of such platform, of a stationary rind stripper extending across the front edge of such platform, having a surface adapted to support the meat in position for cutting, and an under surface adapted to withhold the rind from the slicing knife, such rind stripper being vertically adjustable.

10. In a meat slicing machine, the combination with a laterally, reciprocally, movable meat supporting platform and a slicing knife having its cutting edge in a plane beyond the front edge of such platform, of a stationary rind stripper extending across the front edge of such platform and overlapping the edge of such slicing knife, such rind stripper having a surface adapted to support the meat in position for cutting, and an under surface adapted to withhold the rind from the slicing knife.

In witness whereof, I have hereunto subscribed my name in the presence of two witnesses this 13th day of December, 1912.

ADELBERT L. GARDNER.

Witnesses:
LILLIAN E. CHRISTIANSON,
S. D. HIRSCHL.

Copies of this patent may be obtained for five cents each, by addressing the "Commissioner of Patents, Washington, D. C."